United States Patent
Pennisi et al.

(10) Patent No.: US 9,354,857 B2
(45) Date of Patent: May 31, 2016

(54) SYSTEM AND METHOD TO UPDATE FIRMWARE ON A HYBRID DRIVE

(75) Inventors: Joseph Michael Pennisi, Apex, NC (US); Randall Scott Springfield, Chapel Hill, NC (US); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2188 days.

(21) Appl. No.: 12/051,301

(22) Filed: Mar. 19, 2008

(65) Prior Publication Data

US 2009/0241103 A1 Sep. 24, 2009

(51) Int. Cl.
*G06F 21/00* (2013.01)
*G06F 9/445* (2006.01)
*G06F 3/06* (2006.01)

(52) U.S. Cl.
CPC .............. *G06F 8/65* (2013.01); *G06F 3/0601* (2013.01); *G06F 2003/0697* (2013.01); *Y02B 60/183* (2013.01)

(58) Field of Classification Search
CPC .................................................. G06Q 2220/16
USPC ........................................... 705/50; 717/168
See application file for complete search history.

(56) References Cited

U.S. PATENT DOCUMENTS

| | | | | |
|---|---|---|---|---|
| 6,986,064 | B2* | 1/2006 | Yoshimoto et al. | 713/300 |
| 2006/0234632 | A1* | 10/2006 | Lin | H04W 8/245 455/41.2 |
| 2006/0259756 | A1* | 11/2006 | Thompson | G06F 8/65 713/2 |
| 2008/0072068 | A1* | 3/2008 | Wang et al. | 713/191 |
| 2008/0126784 | A1* | 5/2008 | Iima et al. | 713/2 |
| 2008/0147964 | A1* | 6/2008 | Chow | G06F 21/34 711/103 |
| 2009/0007089 | A1* | 1/2009 | Rothman | G06F 8/65 717/168 |

* cited by examiner

*Primary Examiner* — Charles C Agwumezie
(74) *Attorney, Agent, or Firm* — John L. Rogitz; John M. Rogitz

(57) ABSTRACT

A system, method, and program product is provided that updates the firmware on a hybrid drive by reserving a memory area within the hybrid disk drive's nonvolatile memory buffer. The firmware update is then stored in the reserved memory area. The next time the platters of the hybrid disk drive spin up, the firmware update that is stored in the reserved memory area is identified. The identified update is then written to a firmware memory of a firmware that controls the operation of the hybrid drive. In one embodiment, the update is written to the firmware memory by flashing the firmware's memory. After the firmware is updated, the hybrid drive is reset. Resetting of the hybrid drive includes executing the updated firmware.

20 Claims, 6 Drawing Sheets

SYSTEM AND METHOD TO UPDATE FIRMWARE ON A HYBRID DRIVE

BACKGROUND OF THE INVENTION

1. Technical Field

The present invention relates to a system, method, and program product that updates firmware on a hybrid drive.

2. Description of the Related Art

A hybrid drive, a.k.a. Hybrid Hard Drive (HHD), is a type of large-buffer computer hard disk drive. A hybrid drive is different from traditional hard drives in that hybrid drives use a large buffer of non-volatile flash memory to cache data during normal use. By primarily using this large buffer for non-volatile data storage, the platters of the hard drive are at rest almost all of the time, instead of constantly spinning as they are in current hard drives. This offers numerous benefits, chief among them speed, decreased power consumption, improved reliability, and a faster boot process. Because hybrid drives use less power, they are becoming increasingly popular with notebook computer systems where power consumption and battery life are important characteristics.

In contrast to traditional hard drives, the platters (i.e., magnetic media where data is stored) in a hybrid drive are often at rest and are not spinning. While the platters are at rest, any data that is written to the hybrid drive is written instead to the nonvolatile buffer. In one implementation, the hybrid drive's platters spin up for two basic reasons. The first reason the hybrid platters spin up is when the hybrid drive's nonvolatile buffer begins to near its capacity. When the buffer nears capacity, the platters of the hard drive spin up and the data stored in the buffer is written to the hard drive and cleared from the buffer. After the data is cleared from the buffer, the platters will again return to an off state (spin down), and the cache is essentially empty for use again. The second primary reason that the hybrid drive spins up is when a request is made to access data from the hard drive that is not already stored in the buffer. In this case, the platters spin up to access the data and place it onto the buffer. After the data is stored in the buffer, the platters will once again return to an off state (spin down).

Because the hybrid drive utilizes nonvolatile flash memory (such as the memory used in a USB key), as opposed to volatile memory (such as RAM), the buffer is able to retain all the data even in the event of a sudden power failure or reboot. In addition, the buffer can even be used to store data and files used to boot the system.

One challenge in using hybrid drives is updating the firmware that operates the hybrid drive. This is because operating systems, such as windows, use files, such as swap files, that can be read from or written to at any time. Therefore, taking the hybrid drive offline on demand is quite challenging due to the way that many operating systems read and write data that is essential to the operation of the computer system.

SUMMARY

It has been discovered that the aforementioned challenges are resolved using a system, method and computer program product that updates a hybrid disk drive's firmware by reserving a memory area within the hybrid disk drive's nonvolatile memory buffer. The firmware update is then stored in the reserved memory area. The next time the platters of the hybrid disk drive spin up, the firmware update that is stored in the reserved memory area is identified. The identified update is then written to a firmware memory of a firmware that controls the operation of the hybrid drive. In one embodiment, the update is written to the firmware memory by flashing the firmware's memory. After the firmware is updated, the hybrid drive is reset. Resetting of the hybrid drive includes executing the updated firmware.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
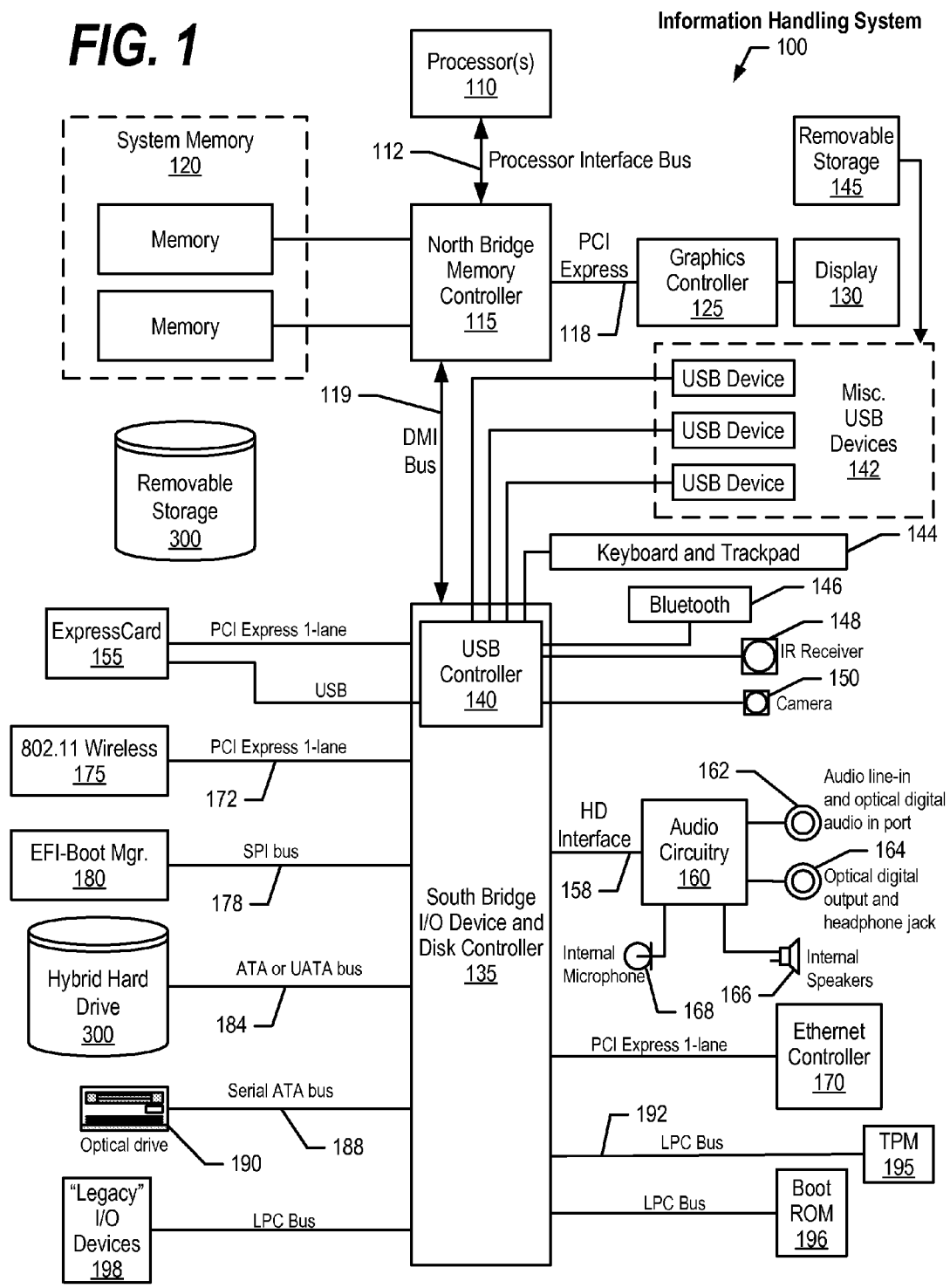
FIG. 1 is a block diagram of a data processing system in which the methods described herein can be implemented.
Figure 2:
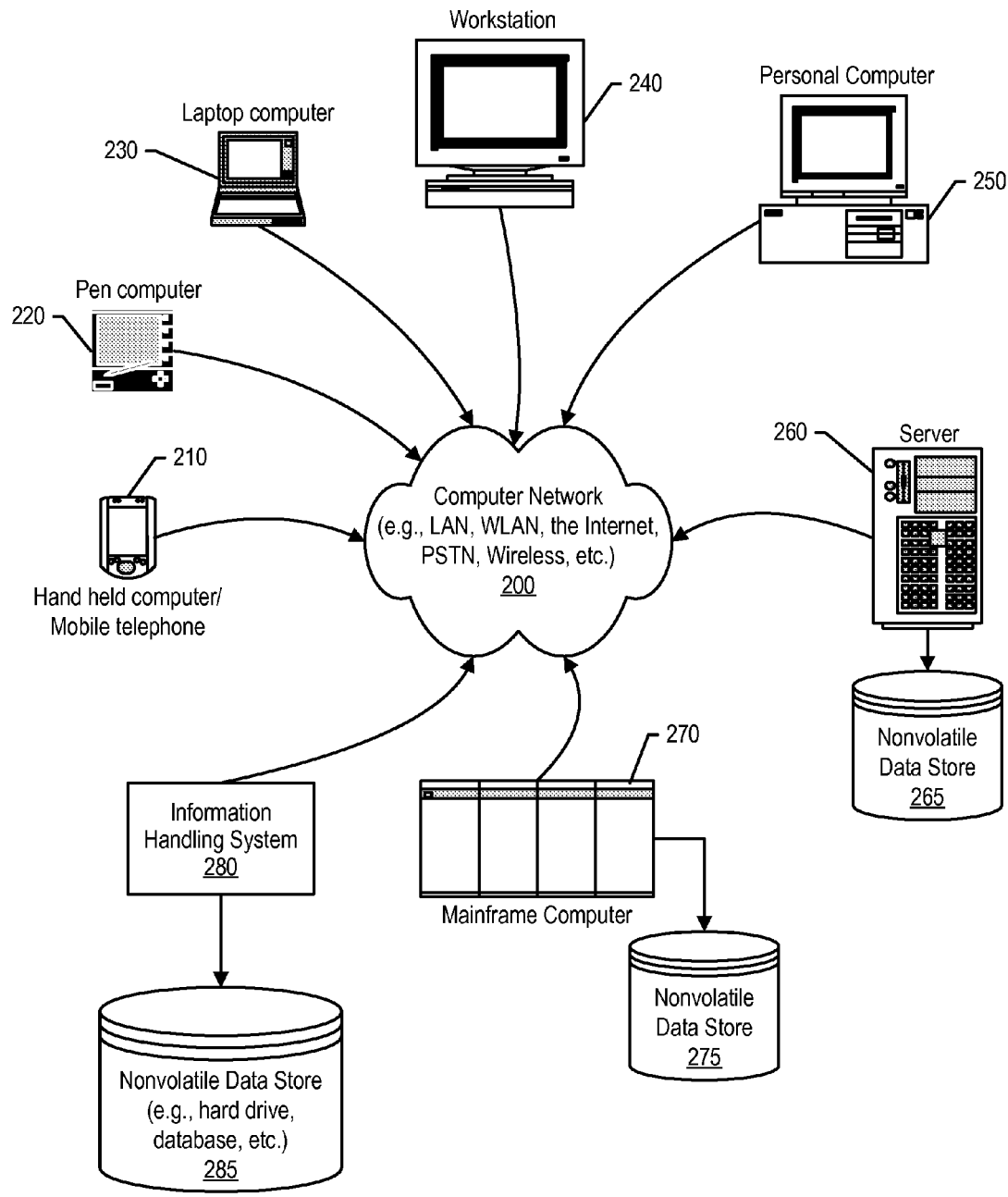
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a hybrid disk drive, such as hybrid disk drive 300 shown in FIGS. 3-6.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
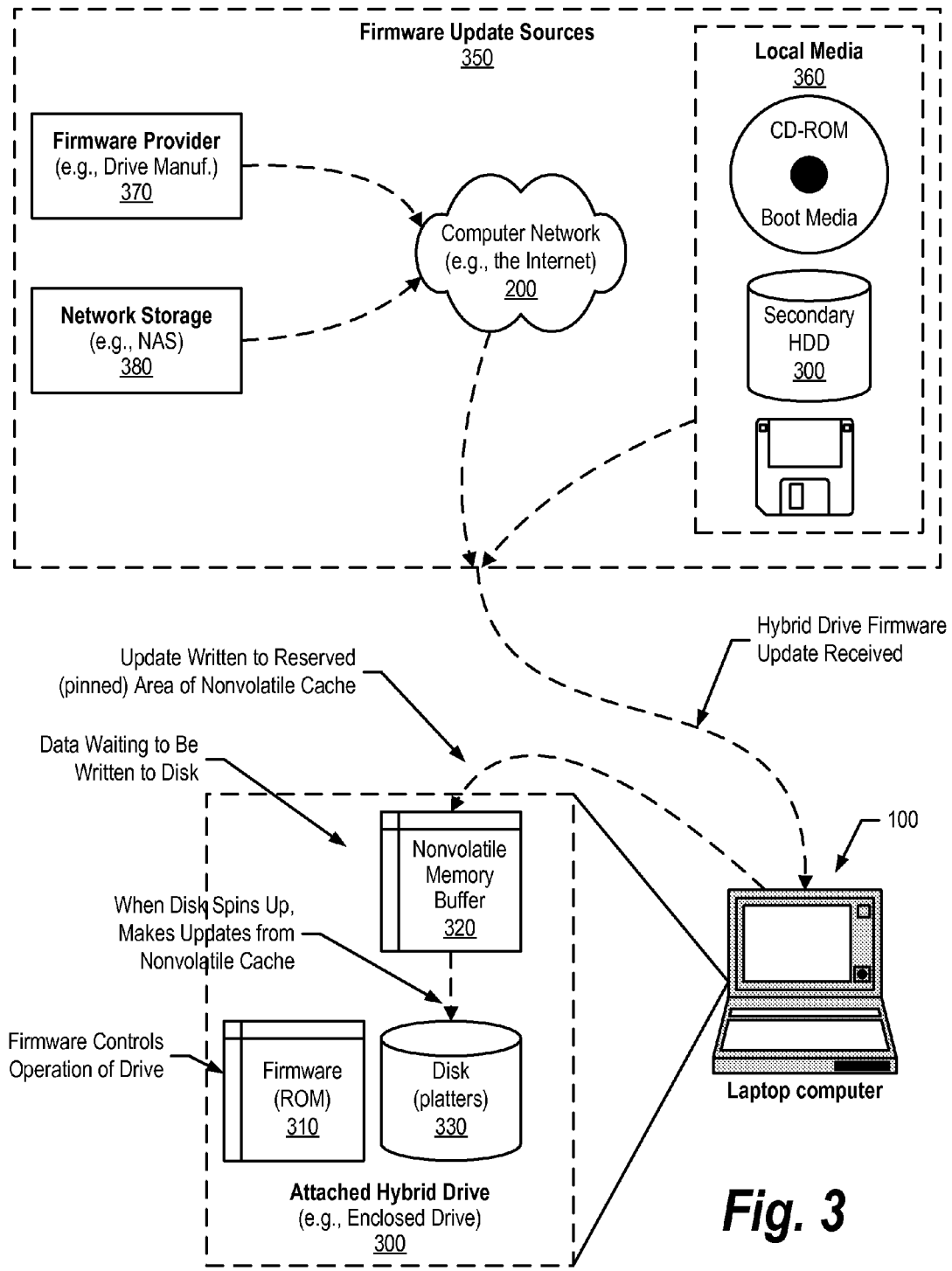
FIG. 3 is a component diagram showing the various components that are used to update a hybrid drive's firmware.

FIG. 3 is a component diagram showing the various components that are used to update a hybrid drive's firmware. Information handling system 100, such as a laptop computer includes hybrid disk drive 300. As shown, hybrid disk drive 300 includes firmware 310 that includes instructions that control the operation of the hybrid disk drive. The firmware is embedded in a recordable nonvolatile memory, such as a flash ROM. As known by those skilled in the art, flash ROM, or flash memory, is a nonvolatile memory that can be electrically erased and reprogrammed. In this manner, the operation of the hybrid disk drive can be altered by updating the firmware stored in firmware memory 310. As used herein, firmware 310 is the programmable content of the hybrid disk drive. In one embodiment, a firmware update is a set of instructions, such as a program or programs, that are executed by the hybrid disk drive in order to control its operation. Nonvolatile memory buffer 320 is a buffer that is used by information handling system to read and write data, especially while disk 330 is idle (i.e., the platters of disk 330 are not spinning). When a request is made to read data from hybrid disk drive 330 that is not already stored in nonvolatile memory buffer 320, then disk 330 spins up and the data is retrieved from the disk. In one embodiment, this data is stored in nonvolatile memory buffer 320, and in another embodiment, this data is transferred to the memory (RAM) of information handling system 100 without being stored in nonvolatile memory buffer 320. In addition, when nonvolatile memory buffer 320 is nearing capacity (i.e., is almost full), then disk 330 spins up and data stored in nonvolatile memory buffer 320 that is waiting to be stored in disk 330 is written to disk 330 and the data is cleared from nonvolatile memory buffer 320.

Firmware update sources 350 represent various sources that may provide information handling system 100 with a firmware update to apply to hybrid disk drive 300. As shown, these sources include local media 360, such as CD-ROMS, nonvolatile drives (e.g., USB drives, etc.), and external disks, such as a floppy disk. Local media 360 is typically read by information handling system 100 using an appropriate device, such as a CD-ROM or DVD drive, a USB interface, a floppy drive, etc. In addition, firmware update sources also include servers, such as those provided by a firmware provider or hybrid disk drive manufacturer, which are connected to information handling system 100 using computer network 200. These servers provide an interface, such as a web site or web page, that is accessed by information handling system 100 to retrieve the firmware update. Another possible source of firmware updates is a network attached storage (NAS) device 380. Again, information handling system retrieves the firmware update from NAS 380 by accessing NAS 380 using computer network 200, such as a local area network (LAN) utilized by an organization. Using NAS 380, an organization can implement a policy where an Information Technology (IT) administrator tests and approves updates, including firmware updates, and stores approved updates on NAS 380 so that organizational users, such as employees, can access NAS 380 and retrieve appropriate firmware updates with greater confidence that the updates have been tested and approved and are less likely to damage or cause disruption with the user's use of information handling system 100.

Regardless of the particular firmware update source 350, the firmware update that is being applied to hybrid disk drive 300 is received by information handling system 100 and, when the firmware installation program is executed by the information handling system's CPU, the installation program stores the firmware update in a reserved (pinned) memory area of nonvolatile memory buffer 320. The next time disk 330 spins up, the firmware running the hybrid disk drive will identify the firmware update stored in the reserved memory area and write the firmware update to the hybrid disk drive's firmware 310.

Figure 4:
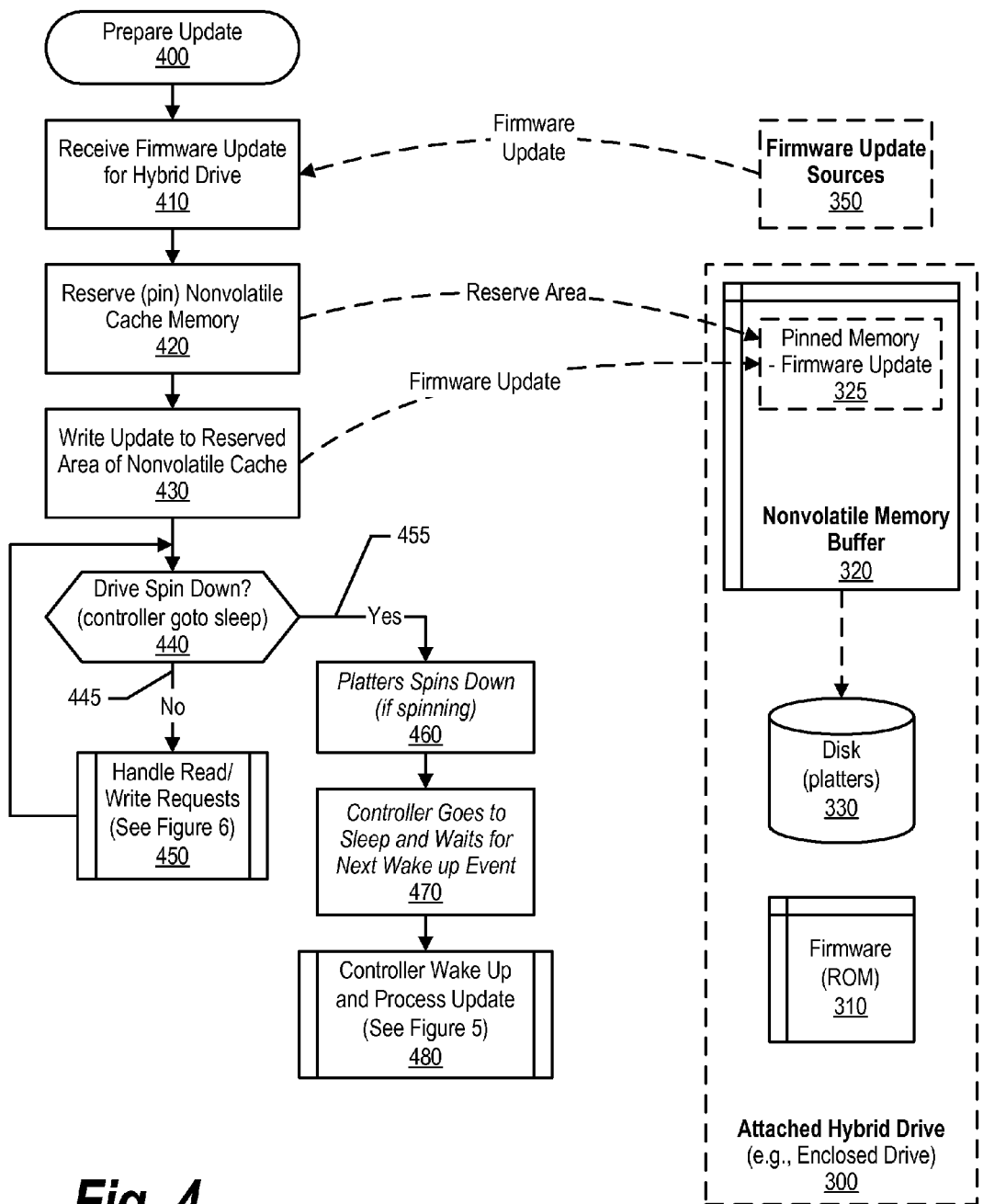
FIG. 4 is a flowchart showing steps performed in preparing a firmware update of a hybrid drive.

FIG. 4 is a flowchart showing steps performed in preparing a firmware update of a hybrid drive. Processing by the user's information handling system is shown commencing at 400. At step 410, the information handling system receives a firmware update to apply to the hybrid disk drive from one or more firmware update sources 350. In one embodiment, an installation routine is executed by the information handling system's CPU to execute instructions that, at step 420, reserve a memory area (pinned memory area 325) within nonvolatile memory buffer 320 and, at step 430, write the firmware update to reserved memory area 325.

A determination is made as to whether the hybrid disk drive controller is going to sleep, such as when a drive (platter) spin down event is takes place (decision 440). If the controller is not going to sleep (e.g., a drive spin down event is not taking place), then decision 440 branches to "no" branch 445 whereupon, at predefined process 450, read and write requests from/to the hybrid disk drive are handled by the current (old) version of the hybrid disk drive firmware (see FIG. 6 and corresponding text for processing details). This handling of read and write requests continues an event is triggered to spin down the hybrid disk drive (disk platters 330). When the controller is going to sleep (e.g., a spin down event occurs), then decision 440 branches to "yes" branch 455 whereupon, at step 460, disk platters 330, spin down (if they were spinning). At step 470, the hybrid disk drive goes to sleep and processing waits for the next hybrid disk drive controller wake-up event to occur (e.g., when a spin up cycle of disk platters 330 takes place). As mentioned before, two times when the spin up cycle takes place are (1) when a read request is received by the hybrid disk drive for data that is not included in nonvolatile memory buffer 320, and (2) when nonvolatile memory buffer 320 is nearing capacity (i.e., is nearly full). In both these cases, the hybrid disk drive controller would wake up and disk platters 330 spin up so that (1) the requested data can be read from disk 330, and (2) data waiting to be written to disk 330 can be read from nonvolatile memory buffer 320, written to disk platters 330, and the data written to disk platters 330 can be cleared from nonvolatile memory buffer 320. When a hybrid disk drive controller wake up event takes place, at predefined process 480, the hybrid disk drive controller wakes up and, if needed, the platters spin up, and the firmware update stored in reserved memory area 325 is processed and written to firmware memory 310 (see FIG. 5 and corresponding text for processing details).

Figure 5:
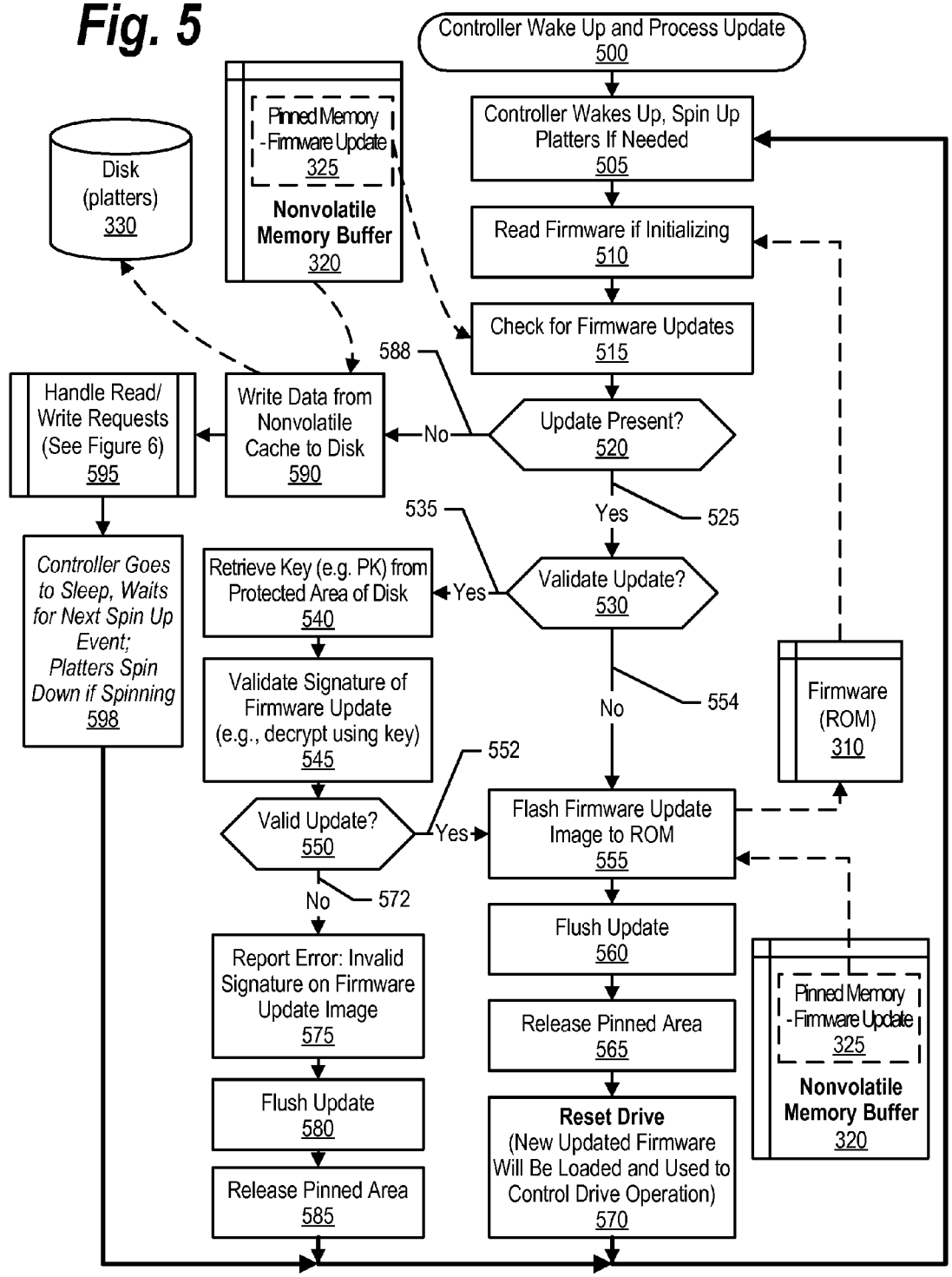
FIG. 5 is a flowchart showing steps taken to during a hybrid drive's initialization (spin up) process.

FIG. 5 is a flowchart showing steps taken to during a hybrid drive's initialization (spin up) process. Processing performed by the hybrid disk drive (the firmware code that controls the hybrid disk drive) is shown commencing at 500. At step 505, the hybrid disk drive platters spin up. If the hybrid disk drive is initializing (e.g., after a reset event or when the hybrid disk drive is first initialized, such as when the computer system that includes the hybrid disk drive boots up, etc.), then at step 510, the firmware that controls the hybrid disk drive is read from firmware ROM 310. While firmware 310 is shown as a "firmware ROM", the nonvolatile memory that is used to store the firmware is actually updatable, such as a flash memory. At step 515, the hybrid disk drive checks for any firmware updates that may be waiting to be applied to the hybrid disk drive's firmware. In one embodiment, reserved memory area 325 of nonvolatile memory buffer 320 is a specific memory region that is reserved for system functions. If code is located in the specific memory region, it is identified as a firmware update.

A determination is made as to whether a firmware update is present in the hybrid disk drive's nonvolatile memory buffer 320 (decision 520). If an update is present, then decision 520 branches to "yes" branch 525 whereupon, a determination is made as to whether the system validates firmware updates before applying the update (decision 530). Validation of firmware updates is performed so that a rogue or malevolent process does not update the firmware code with code designed to damage or disrupt operation of the hybrid disk drive. Validation can also be used so that only approved updates can be applied to the hybrid disk drive, thus preventing unintended problems if the user applies an unapproved update to the drive.

If updates are validated, then decision 530 branches to "yes" branch 535 whereupon, at step 540, a key, such as an encryption key, is retrieved from a protected area of the hybrid disk drive (either from a protected area of nonvolatile memory buffer 320 or a protected area of disk 330). In one embodiment, the protected area is an area that can only be accessed by the hybrid disk drive and is not accessible by a user or from outside the hybrid disk drive. At step 545, a signature of the firmware update that is stored in reserved memory area 325 is validated using the retrieved encryption key. In one embodiment, the firmware update that is received and stored in reserved memory area 325 is encrypted using a first encryption key. This code is decrypted using the retrieved encryption key. If a single key is used to encrypt and decrypt the firmware update, then the key retrieved from the protected area of the hybrid disk drive is the same as the first encryption key. If asymmetric keys are used (one to encrypt and a different key to decrypt), then the key retrieved from the protected area corresponds to the first key with the retrieved key and the first key comprising the asymmetric key set.

A determination is made as to whether, based on the validation performed in step 545, the firmware update is valid (decision 550). If either the update is valid (with decision 550 branching to "yes" branch 552) or updates are not validated (with decision 530 branching to "no" branch 554), then at step 555, the firmware update image is flashed (written) to firmware memory 310. If the firmware update stored in reserved memory area 325 was encrypted, then the key retrieved at step 540 is used to decrypt the update and the decrypted firmware update is written to the firmware memory at step 555. At step 560, the update is flushed from reserved memory area 325 of nonvolatile memory buffer 320, and at step 565, reserved (pinned) memory area 325 is released (i.e., no longer reserved). At step 570, the hybrid disk drive is reset which will cause the new version of the firmware to be read (at step 510) and the new updated firmware will then be used to operate the drive. Processing then loops back to read the firmware and load the new updated firmware code and continue hybrid disk drive operations using the updated firmware code.

Returning to decision 550, if the update is being validated, but the update stored in reserved memory area 325 is not valid, then decision 550 branches to "no" branch 572 whereupon, at step 575, an error is logged that an invalid signature was found on the firmware update image. At step 580, the update is flushed from reserved memory area 325 of nonvolatile memory buffer 320, and at step 585, reserved (pinned) memory area 325 is released (i.e., no longer reserved). Processing then loops back to continue operating the hybrid disk drive using the old firmware code as the new firmware code was not applied and written (flashed) to firmware memory 310.

Returning to decision 520, if a firmware update is not present in nonvolatile memory buffer 320, then decision 520 branches to "no" branch 588 whereupon, at step 590, data stored in nonvolatile memory buffer 320 that is waiting to be written to disk platters 330 are written to the platters and data written to disk 330 is cleared from nonvolatile memory buffer 320. At predefined process 595, read and write requests that are received while disk 330 is spinning are processed (see FIG. 6 and corresponding text for processing details). At some point (step 598) the hybrid disk drive controller goes to sleep and disk platters 330 spin down and the hybrid disk drive controller waits for a wake-up event to occur, such as a need to spin-up the platters in order to read from or write to the platters.

In an additional embodiment, the hybrid disk drive controller periodically wakes up without spinning up the platters in order to check if there are any updates stored in nonvolatile memory buffer 320 that may need to be processed. In this additional embodiment, the hybrid disk drive controller may wake up when a signal is received from a processor of the computer system or on a predetermined time schedule (e.g., every 10 minutes, etc.).

As mentioned above, processing waits for the next hybrid disk drive controller wake-up event to occur. When a hybrid disk drive wake up event occurs (e.g., the platters need to spin up, the hybrid disk drive controller wakes up at a particular time interval, etc.), then processing loops back to wake up the hybrid disk drive controller and, if needed, spin up the disk platters (step 505). When the hybrid disk drive controller wakes up, it will operate according to the instructions stored in firmware memory 310. When a firmware update is applied, using the steps described above, then the updated firmware will be the instructions used to control the hybrid disk drive controller.

Figure 6:
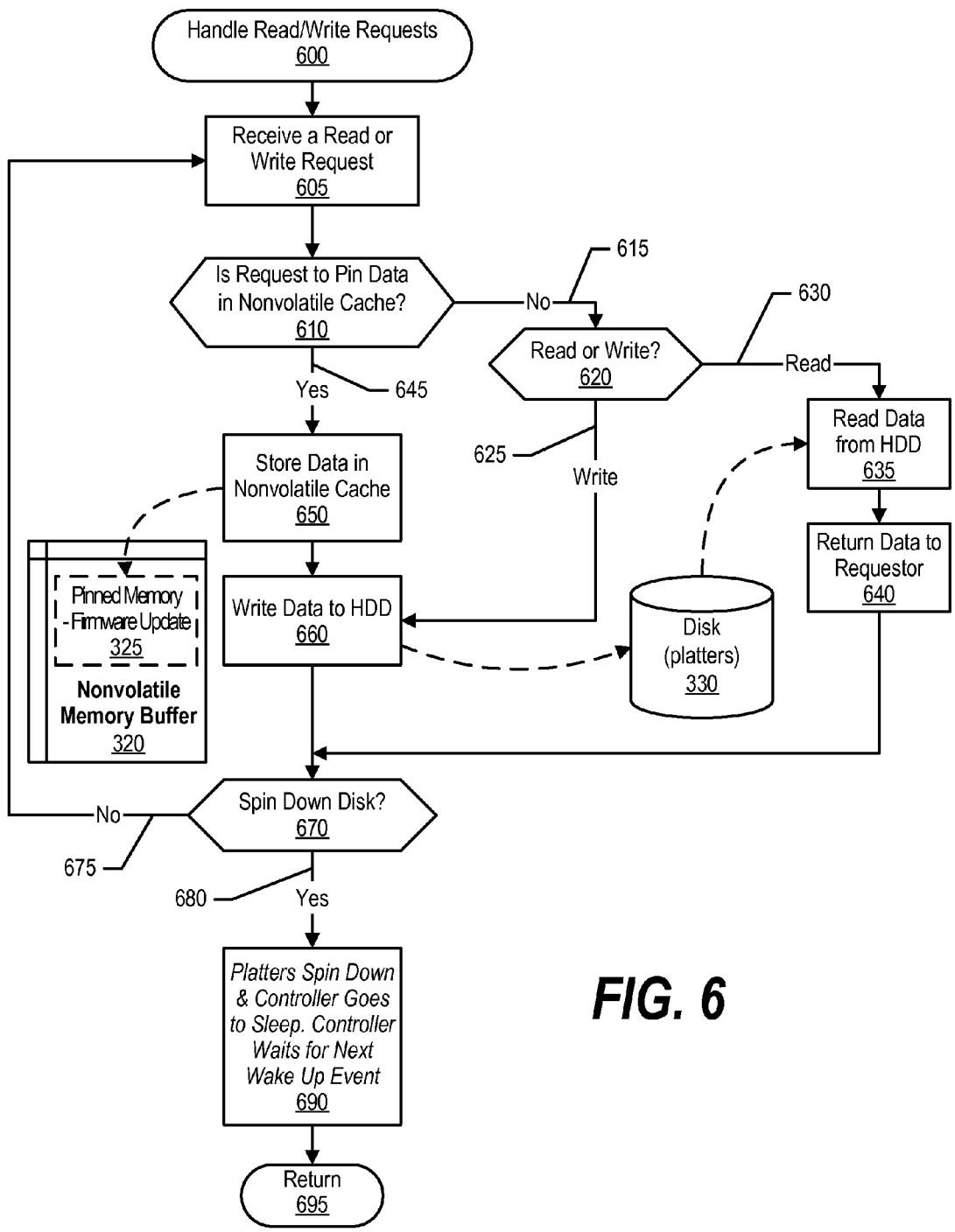
FIG. 6 is a flowchart showing steps taken by the hybrid drive to handle read and write requests.

FIG. 6 is a flowchart showing steps taken by the hybrid drive to handle read and write requests. Processing commences at 600 whereupon, at step 605, a request to read data from the hybrid disk drive is received or a request to write data to the hybrid disk drive is received. A determination is made as to whether the request is to write (pin) data to reserved memory area 325 of nonvolatile memory buffer 320 (decision 610). If the request is not to pin data to the reserved memory area, then decision 610 branches to "no" branch 615 whereupon a determination is made as to whether the request is to read or write data to the hybrid disk drive (decision 620). If the request is to write data to the hybrid disk drive, then decision 620 branches to "write" branch 625 whereupon, at step 660, the data is written to disk 330. In one embodiment, while disk platters 330 are spinning, the data is written directly to the disk platters and not written to nonvolatile memory buffer 320. In another embodiment, while the disk platters are spinning, the data is written to both disk platters 330 and to nonvolatile memory buffer 320. Returning to decision 620, if the request is to read data from the hybrid disk drive, then decision 620 branches to "read" branch 630 whereupon, at step 635, the requested data is read from disk platters 330 and, at step 640, the requested data is returned to the requesting process (e.g., a process that is being executed by a processor in the information handling system that is requesting the data). In one embodiment, a copy of the data that is read is stored in nonvolatile memory buffer 320, while in another embodiment, the data is returned to the requester and a copy is not stored in the nonvolatile memory buffer.

Returning to decision 610, if the request is to write (pin) data to a reserved memory area 325 of nonvolatile memory buffer 320, then decision 610 branches to "yes" branch 645 whereupon, at step 650, the data (firmware update) is stored in reserved memory area 325 of nonvolatile memory buffer 320. If needed, memory 325 is reserved ("pinned") within nonvolatile memory buffer 320 before the firmware update is stored. In one embodiment, at step 660, the firmware update that is stored in reserved memory area 325 is also written to disk platters 330, thus maintaining a copy of the firmware update on the disk platters. In another embodiment, the firmware update is written to the reserved memory area but is not written to disk platters 330.

A determination is made as to whether a spin down event has occurred (decision 670). If a spin down event has not occurred, then decision 670 branches to "no" branch 675 and the process loops back to continue receiving requests to read or write data to the hybrid disk drive. This processing continues until a spin down event occurs, at which point decision 670 branches to "yes" branch 680 whereupon, at step 690, disk platters 330 spin down and the hybrid disk drive waits for a spin up event to occur (see FIG. 5 and corresponding text for details regarding the processing that occurs a spin up event occurs, including how a firmware update (if stored using the processing shown in FIG. 6) is applied to the hybrid disk drive). Processing then returns at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   reserving a memory area within a nonvolatile memory buffer of a hybrid disk drive that is controlled by a hybrid disk drive controller, wherein the hybrid disk drive includes one or more platters, the nonvolatile memory buffer, and a firmware nonvolatile memory;
   storing a firmware update in the reserved memory area;
   detecting the hybrid disk drive controller waking up from a sleep mode;
   in response to detecting the hybrid disk drive controller waking up from the sleep mode:
   identifying the firmware update stored in the reserved memory area;
   writing the firmware update to the firmware memory of a firmware that controls the operation of the hybrid drive, wherein the writing includes flashing the update to the firmware memory; and
   resetting the hybrid disk drive in response to writing the firmware update to the firmware memory, wherein the resetting includes executing the updated firmware.

2. The method of claim 1 further comprising: retrieving a validation key prior to the writing; and validating the firmware update using the retrieved validation key, wherein the writing is only performed in response to successfully validating the firmware update.

3. The method of claim 1 further comprising:
   flushing the firmware update from the reserved memory area after the firmware update is written to the firmware memory; and
   releasing the reserved memory area after the firmware update has been flushed.

4. The method of claim 1 further comprising: after identifying that the firmware update is stored in the reserved memory area: retrieving an encryption key from a protected area of the hybrid disk drive, wherein the protected area is inaccessible from outside of the hybrid disk drive; and validating the firmware update using the retrieved encryption key, wherein the writing step is performed in response to successfully validating the firmware update, and wherein the firmware update is not written to the firmware memory in response to an unsuccessful validation.

5. The method of claim 1 wherein the hybrid disk drive includes the one or more platters, the nonvolatile memory buffer, and the firmware nonvolatile memory in a single hybrid disk drive enclosure.

6. The method of claim 1 further comprising:
   receiving the firmware update from one or more firmware update sources, wherein the firmware update is written to the reserved memory area after the receiving; and
   wherein the sleep mode corresponds to spinning down one or more of the platters and the waking up from the sleep mode corresponds to a request to read from or write to the one or more platters.

7. The method of claim 6 wherein one of the firmware update sources is a server that is connected to the machine via a computer network, the method comprising: downloading the firmware update from the server to the machine; and storing the firmware update in a memory of the machine prior to storing the update in the reserved memory area.

8. A information handling system comprising:
one or more processors;
a memory accessible by at least one of the processors;
a hybrid disk drive controller that is accessible by at least one of the processors, the hybrid disk drive controller controlling a hybrid disk drive that includes a nonvolatile memory buffer, one or more platters, and a firmware memory that includes controller instructions executed by the hybrid disk drive controller;
a set of instructions which are loaded into memory and executed by at least one of the processors while the computer system is booted from the alternate boot media in order to perform actions of:
reserving a memory area within the nonvolatile memory buffer;
storing a firmware update in the reserved memory area;
detecting they hybrid disk drive controller wake up from a sleep mode;
in response to detecting the hybrid disk drive controller waking up from the sleep mode:
identifying the firmware update stored in the reserved memory area;
writing the firmware update to the firmware memory, wherein the writing includes flashing the update to the firmware memory; and
resetting the hybrid disk drive in response to writing the firmware update to the firmware memory, wherein the resetting includes executing the updated firmware.

9. The information handling system of claim 8 wherein the instructions executed by at least one of the processors perform additional actions comprising: retrieving a validation key prior to the writing; and validating the firmware update using the retrieved validation key, wherein the writing is only performed in response to successfully validating the firmware update.

10. The information handling system of claim 8 wherein the instructions executed by at least one of the processors perform additional actions comprising:
flushing the firmware update from the reserved memory area after the firmware update is written to the firmware memory; and
releasing the reserved memory area after the firmware update has been flushed.

11. The information handling system of claim 8 wherein the instructions executed by at least one of the processors perform additional actions comprising: after identifying that the firmware update is stored in the reserved memory area: retrieving an encryption key from a protected area of the hybrid disk drive, wherein the protected area is inaccessible from outside of the hybrid disk drive; and validating the firmware update using the retrieved encryption key, wherein the writing step is performed in response to successfully validating the firmware update, and wherein the firmware update is not written to the firmware memory in response to an unsuccessful validation.

12. The information handling system of claim 8 wherein the hybrid disk drive includes the one or more platters, the nonvolatile memory buffer, and the firmware nonvolatile memory in a single hybrid disk drive enclosure.

13. The information handling system of claim 8 wherein the instructions executed by at least one of the processors perform additional actions comprising:
receiving the firmware update from one or more firmware update sources, wherein the firmware update is written to the reserved memory area after the receiving; and wherein the sleep mode corresponds to spinning down one or more of the platters and the waking up from the sleep mode corresponds to a request to read from or write to the one or more platters.

14. The information handling system of claim 13 wherein one of the firmware update sources is a server that is connected to the information handling system via a network adapter, wherein the instructions executed by at least one of the processors perform additional actions comprising: downloading the firmware update from the server to the information handling system; and storing the firmware update in a memory of the information handling system prior to storing the update in the reserved memory area.

15. A computer program product stored in a computer readable medium, comprising functional descriptive material that, when executed by an information handling system, causes the information handling system to perform actions that include:
reserving a memory area within a nonvolatile memory buffer of a hybrid disk drive that is controlled by a hybrid disk drive controller, wherein the hybrid disk drive includes one or more platters, the nonvolatile memory buffer, and a firmware nonvolatile memory;
storing a firmware update in the reserved memory area;
detecting the hybrid disk drive controller waking up from a sleep mode;
in response to detecting the hybrid disk drive controller waking up from a sleep mode:
identifying the firmware update stored in the reserved memory area;
writing the firmware update to the firmware memory of a firmware that controls the operation of the hybrid drive, wherein the writing includes flashing the update to the firmware memory; and
resetting the hybrid disk drive in response to writing the firmware update to the firmware memory, wherein the resetting includes executing the updated firmware.

16. The computer program product of claim 15 further comprising functional descriptive material that causes the information handling system to perform additional actions that include:
retrieving a validation key prior to the writing; and
validating the firmware update using the retrieved validation key, wherein the writing is only performed in response to successfully validating the firmware update.

17. The computer program product of claim 15 further comprising functional descriptive material that causes the information handling system to perform additional actions that include:
flushing the firmware update from the reserved memory area after the firmware update is written to the firmware memory; and
releasing the reserved memory area after the firmware update has been flushed.

18. The computer program product of claim 15 further comprising functional descriptive material that causes the information handling system to perform additional actions that include:
after identifying that the firmware update is stored in the reserved memory area:
retrieving an encryption key from a protected area of the hybrid disk drive, wherein the protected area is inaccessible from outside of the hybrid disk drive; and
validating the firmware update using the retrieved encryption key, wherein the writing step is performed in response to successfully validating the firmware update, and wherein the firmware update is not written to the firmware memory in response to an unsuccessful validation.

19. The computer program product of claim 15 further comprising functional descriptive material that causes the information handling system to perform additional actions that include:
   receiving the firmware update from one or more firmware update sources, wherein the firmware update is written to the reserved memory area after the receiving; and
   wherein the sleep mode corresponds to spinning down one or more of the platters and the waking up from the sleep mode corresponds to a request to read from or write to the one or more platters.

20. The computer program product of claim 15 wherein one of the firmware update sources is a server that is connected to the information handling system via a computer network and further comprising functional descriptive material that causes the information handling system to perform additional actions that include:
   downloading the firmware update from the server to the machine; and
   storing the firmware update in a memory of the machine prior to storing the update in the reserved memory area.

* * * * *